Patented July 9, 1935

2,007,642

UNITED STATES PATENT OFFICE 2,007,642

PROCESS FOR THE MANUFACTURE OF CARBOXYLIC ACID ANHYDRIDES

Martin de Simo, Berkeley, Calif., assignor to Shell Development Company, San Francisco, Calif., a corporation of Delaware No Drawing. Application November 3, 1931, Serial No. 572,877

14 Claims. (Cl. 260—123)

My invention relates to a process for the manufacture of acid anhydrides and more particularly is concerned with the preparation thereof by the utilization of ketene.

I am aware of the existing processes wherein (1) $POCl_3$ is reacted with the sodium salt of the fatty acid to give the anhydride of the same; (2) an acid chloride and the sodium salt of the acid are reacted for the same purpose; (3) an acid chloride and the free acid are reacted; and (4) acetic anhydride and the acid are reacted.

My process partakes of none of the outward indicia of the methods practiced by the industry.

I have found that when ketene or a gas mixture containing ketene is scrubbed with fatty acids higher than acetic acid, such as propionic, isobutyric, n-butyric, isovalerianic and the like, the mixed anyhdride of acetic acid or of a homologous acid and the higher fatty acid is formed. The mixed anhydride on heating rearranges and the separate anhydrides of both acids form. By distillation these can be separated.

The ketene can be employed either in the gaseous or liquid phase, preferably in the former. When so utilized, it may exist in the substantially pure state or be admixed with inert diluents such as methane and its homologues, ethylene and its homologues, $CO$, $CO_2$, $N_2$, $O_2$, air and the like. The ketene may exist admixed with methane as a result of its formation from a ketone or with $C_2H_4$ and $CO$ as a result of the partial decomposition of the ketene during its manufacture.

By "ketene" is meant a compound of the type $R=CO$, where R represents an organic divalent radical as $CH_2$, $CH_3CH$ and the like as well as their substitution products.

The ketene is introduced into substantially anhydrous acid since any water which may be present combines with ketene to form the corresponding acid. Economically, this is a waste of ketene. The method of contacting the ketene with the acid depends on the phase in which the ketene exists, but is of no great significance. Counter-current flow is preferably employed and when the ketene is in the gaseous phase, I have found it advantageous to scrub the same with the acid undergoing treatment. The reaction is substantially instantaneous at ordinary conditions of temperature and pressure and results in the formation of the mixed anhydride. The mixed anhydride is heated substantially to its boiling point in a still fitted with a fractionating column and reflux condenser. During this heating the mixed anhydride rearranges to a mixture of the separate anhydrides, one of which is lower boiling and the other higher boiling than the original mixed anhydride. The fractionating column and reflux condenser are so designed and operated that only the lower boiling anhydride is removed as distillate. Any mixed anhydride, if distilled, is returned to the still and ultimately converted, with the result that finally the substantially pure lower boiling anhydride is obtained as distillate and the substantially pure higher boiling anhydride remains in the still from which it may be submitted to further rectification in order to purify it completely.

Another modification may be practiced by refluxing the mixed anyhdride until conversion is complete and then separating the individual anhydrides by selective absorption.

Where the ketene contains the same number of carbon atoms to the molecule as the acid undergoing treatment, it is to be appreciated that no mixed anhydride is formed which rearranges itself by heating, thus permitting the recovery of two specific acid anhydrides. Accordingly such feature is not embraced by the present case which is concerned with the intermediate formation of mixed anhydrides of the formula

in which $R_1$ and $R_2$ represent different organic radicals, for example, alkyl, aryl, unsaturated alkyl, aralkyl or unsaturated aralkyl grouping containing one or more carbon atoms.

Substantially equimolecular proportions of the reagents may be employed altho an excess of ketene would insure the complete utilization of the fatty acid. On the other hand an excess of acid may be used without detrimental effect.

By way of illustration only, reference will be had to the preparation of higher fatty acid anhydrides although it is to be understood that such examples are not to be construed in the limitative sense but rather in the illustrative.

*I*

Ketene, or gases containing ketene, is contacted with a substantially equimolecular weight of butyric acid, either by passing the gas through a distributor into the acid until the correct amount (i. e., equimolecular amount) is absorbed, or by countercurrent absorption in a tower down which acid is flowing. In either case mixed anhydride results according to the reaction:

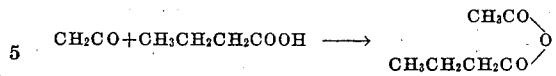

Upon heating in a still equipped with a reflux column two mols of the mixed anhydride rearranged themselves as follows:

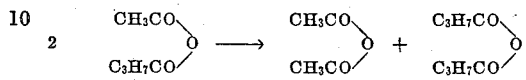

By maintaining the temperature at about 140°–150° C. substantially all of the

was distilled off from the

Subtantially none of the mixed anhydride or butyric anhydride distilled over as their boiling points were respectively 155° to 175° C. and 198°–199° C. The exact boiling point of the mixed anhydride is uncertain due to the fact that it decomposes quite readily.

II

The process was conducted in an equivalent manner with ketene and propionic acid, resulting in the formation of propionic anhydride in the still.

My method is capable of being carried out with unsaturated acids as acrylic, propiolic, isocrotonic and the like as well as with aromatic alkyl carboxylic acids of the type of cinnamic and phenyl propiolic. Aralkyl carboxylic acids as benzylmalonic, phenylacetic, and aromatic carboxylic acids as benzoic, toluic and naphthoic acids are also suitable.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness of accuracy of the theories which I have advanced as to the results attained. On the other hand, the invention is to be regarded as limited only by the terms of the claims, in which it is my intention to claim all novelty inherent therein as broadly as is possible in view of the prior art.

I claim as my invention:

1. A process of preparing acid anhydrides which comprises reacting a ketene with a carboxylic acid containing at least two carbon atoms and containing a different number of carbon atoms than the ketene, in a quantity sufficient to react with any free acid radical and any reactive substituent which may be present, and heating the reaction mixture so as to obtain an anhydride of said carboxylic acid.

2. A process of preparing acid anhydrides which comprises reacting a ketene with an aliphatic carboxylic acid containing more than two carbon atoms in a quantity sufficient to react with any free acid radical and any reactive substituent which may be present, and heating the reaction mixture so as to obtain an anhydride of said carboxylic acid.

3. A process of preparing acid anhydrides which comprises reacting a ketene with an aromatic carboxylic acid containing a different number of carbon atoms than the ketene in a quantity sufficient to react with any free acid radical and any reactive substituent which may be present, and heating the reaction mixture so as to obtain an anhydride of said carboxylic acid.

4. A process of preparing acid anhydrides which comprises reacting a ketene with an aliphatic carboxylic acid containing at least two carbon atoms and containing a different number of carbon atoms than the ketene in a quantity sufficient to react with any free acid radical and any reactive substituent which may be present, and heating the reaction mixture so as to obtain an anhydride of said carboxylic acid.

5. A process of preparing acid anhydrides which comprises reacting a ketene with a saturated aliphatic carboxylic acid containing at least two carbon atoms and containing a different number of carbon atoms than the ketene in a quantity sufficient to react with any free acid radical and any reactive substituent which may be present, and heating the reaction mixture so as to obtain an anhydride of said carboxylic acid.

6. A process of preparing acid anhydrides which comprises reacting $CH_2=C=O$ with a saturated aliphatic carboxylic acid containing more than two carbon atoms in a quantity sufficient to react with any free acid radical and any reactive substituent which may be present, and heating the reaction mixture so as to obtain an anhydride of said carboxylic acid.

7. A process of preparing acid anhydrides which comprises reacting $CH_2=C=O$ with a carboxylic acid containing more than two carbon atoms in a quantity sufficient to react with any free acid radical and any reactive substituent which may be present, heating the reaction mixture under reflux and distilling off acetic anhydride.

8. A process of preparing acid anhydrides which comprises reacting a ketene diluted with an inert gas with a carboxylic acid containing at least two carbon atoms and containing a different number of carbon atoms than the ketene in a quantity sufficient to react with any free acid radical and any reactive substituent which may be present, and heating the reaction mixture so as to obtain an anhydride of said carboxylic acid.

9. A process of preparing acid anhydrides which comprises reacting $CH_2=C=O$ diluted with an inert gas with a carboxylic acid containing more than two carbon atoms in a quantity sufficient to react with any free acid radical and any reactive substituent which may be present, heating the reaction mixture under reflux and distilling off acetic anhydride.

10. A process of preparing acid anhydride which comprises reacting a ketene in the gaseous state with a substantially anhydrous carboxylic acid containing at least two carbon atoms and containing a different number of carbon atoms than the ketene in a quantity sufficient to react with any free acid radical and any reactive substituent which may be present, and heating the reaction mixture so as to obtain an anhydride of said carboxylic acid.

11. A process of preparing acid anhydrides which comprises reacting $CH_2=C=O$ in the gaseous state with a substantially anhydrous carboxylic acid containing more than two carbon atoms in a quantity sufficient to react with any free acid radical and any reactive substituent which may be present, heating the reaction mixture under reflux and distilling off acetic anhydride.

12. A process of preparing acid anhydrides which comprises reacting a ketene with an unsubstituted hydrocarbon carboxylic acid containing at least two carbon atoms and containing a different number of carbon atoms than the ketene in a quantity sufficient to react with any free acid radical and any reactive substituent which may be present, and heating the reaction mixture so as to obtain an anhydride of said carboxylic acid.

13. A process of preparing acid anhydrides which comprises reacting a ketene with an unsubstituted hydrocarbon carboxylic acid containing more than two carbon atoms in a quantity sufficient to react with any free acid radical and any reactive substituent which may be present, and heating the reaction mixture so as to obtain an anhydride of said carboxylic acid.

14. A process of preparing acid anhydrides which comprises reacting a ketene with an unsubstituted hydrocarbon monocarboxylic acid containing at least two carbon atoms and containing a different number of carbon atoms than the ketene in a quantity sufficient to react with any free acid radical and any reactive substituent which may be present, and heating the reaction mixture so as to obtain an anhydride of said carboxylic acid.

MARTIN DE SIMO.

DISCLAIMER 2,007,642.—*Martin de Simo*, Berkeley, Calif. PROCESS FOR THE MANUFACTURE OF CARBOXYLIC ACID ANHYDRIDES. Patent dated July 9, 1935. Disclaimer filed October 25, 1937, by the assignee, *Shell Development Company*.

Hereby disclaims and enters this disclaimer to all of claim 6 of said Letters Patent; also disclaims and enters this disclaimer to:— as much of claim 1 of said Letters Patent as is in excess of the following:

"A process of preparing acid anhydrides which comprises reacting a ketene *containing at least three carbon atoms* with a carboxylic acid containing at least two carbon atoms and containing a different number of carbon atoms than the ketene, in a quantity sufficient to react with any free acid radical and any reactive substituent which may be present, and heating the reaction mixture so as to obtain an anhydride of said carboxylic acid";

as much of claim 2 of said Letters Patent as is in excess of the following:

"A process of preparing acid anhydrides which comprises reacting a ketene *containing at least three carbon atoms* with an aliphatic carboxylic acid containing more than two carbon atoms in a quantity sufficient to react with any free acid radical and any reactive substituent which may be present, and heating the reaction mixture so as to obtain an anhydride of said carboxylic acid";

as much of claim 3 of said Letters Patent as is in excess of the following:

"A process of preparing acid anhydrides which comprises reacting a ketene *containing at least three carbon atoms* with an aromatic carboxylic acid containing a different number of carbon atoms than the ketene, in a quantity sufficient to react with any free acid radical and any reactive substituent which may be present, and heating the reaction mixture so as to obtain an anhydride of said carboxylic acid";

as much of claim 4 of said Letters Patent as is in excess of the following:

"A process of preparing acid anhydrides which comprises reacting a ketene *containing at least three carbon atoms* with an aliphatic carboxylic acid containing at least two carbon atoms and containing a different number of carbon atoms than the ketene, in a quantity sufficient to react with any free acid radical and any reactive substituent which may be present, and heating the reaction mixture so as to obtain an anhydride of said carboxylic acid";

as much of claim 5 of said Letters Patent as is in excess of the following:

"A process of preparing acid anhydrides which comprises reacting a ketene *containing at least three carbon atoms* with a saturated aliphatic carboxylic acid containing at least two carbon atoms and containing a different number of carbon atoms than the ketene, in a quantity sufficient to react with any free acid radical and any reactive substituent which may be present, and heating the reaction mixture so as to obtain an anhydride of said carboxylic acid";

as much of claim 10 of said Letters Patent as is in excess of the following:

"A process of preparing acid anhydrides which comprises reacting a ketene *containing at least three carbon atoms* in the gaseous state with a substantially anhydrous carboxylic acid containing at least two carbon atoms and containing a different number of carbon atoms than the ketene, in a quantity sufficient to react with any free acid radical and any reactive substituent which may be present, and heating the reaction mixture so as to obtain an anhydride of said carboxylic acid";

as much of claim 12 of said Letters Patent as is in excess of the following:

"A process of preparing acid anhydrides which comprises reacting a ketene *containing at least three carbon atoms* with an unsubstituted hydrocarbon carboxylic acid containing at least two carbon atoms and containing a different number of carbon atoms than the ketene, in a quantity sufficient to react with any free acid radical and any reactive substituent which may be present, and heating the reaction mixture so as to obtain an anhydride of said carboxylic acid";

as much of claim 13 of said Letters Patent as is in excess of the following:

"A process of preparing acid anhydrides which comprises reacting a ketene *containing at least three carbon atoms* with an unsubstituted hydrocarbon carboxylic acid containing more than two carbon atoms in a quantity sufficient to react with any free acid radical and any reactive substituent which may be present, and heating the reaction mixture so as to obtain an anhydride of said carboxylic acid";

and as much of claim 14 of said Letters Patent as is in excess of the following:

"A process of preparing acid anhydrides which comprises reacting a ketene *containing at least three carbon atoms* with an unsubstituted hydrocarbon monocarboxylic acid containing at least two carbon atoms and containing a different number of carbon atoms than the ketene, in a quantity sufficient to react with any free acid radical and any reactive substituent which may be present, and heating the reaction mixture so as to obtain an anhydride of said carboxylic acid."

[*Official Gazette, November 30, 1937*.]